United States Patent [19]
Hoffman

[11] Patent Number: 5,887,840
[45] Date of Patent: Mar. 30, 1999

[54] PICK-UP TRUCK TIE DOWN ANCHOR

[76] Inventor: Robert B. Hoffman, 124 E. Curling Dr., Boise, Id. 83702

[21] Appl. No.: 949,611

[22] Filed: Oct. 14, 1997

[51] Int. Cl.⁶ .................................................. A47B 97/00
[52] U.S. Cl. ........................................... 248/503; 248/502
[58] Field of Search .................................... 248/499, 500, 248/502, 503, 505; 24/122.6, 129 R, 129 W

[56] References Cited

U.S. PATENT DOCUMENTS

| | | | |
|---|---|---|---|
| 155,344 | 9/1874 | Szabo | 24/129 R |
| 2,595,806 | 5/1952 | Morris | 24/129 R |
| 2,635,796 | 4/1953 | Davolt | 24/122.6 |
| 3,827,790 | 8/1974 | Wenzel | 24/129 W |
| 4,712,754 | 12/1987 | Brodie | 248/925 |
| 5,020,192 | 6/1991 | Gerlach | 24/129 R |
| 5,349,834 | 9/1994 | Davidge | 248/499 |
| 5,730,346 | 3/1998 | Adams et al. | 248/499 |

Primary Examiner—Ramon O. Ramirez
Assistant Examiner—Robert Lipcsik
Attorney, Agent, or Firm—Wells, St. John, Roberts, Gregory & Matkin P.S.

[57] ABSTRACT

A tie down anchor for a pick-up truck stake pocket is described, in which an elongated flexible cord is formed into an elongated loop including a bight at one end. An elongated bolt member is mounted to the cord adjacent the remaining cable end in transverse relation to the loop. The cable is yieldably biased by the cord to the transverse relation.

20 Claims, 5 Drawing Sheets

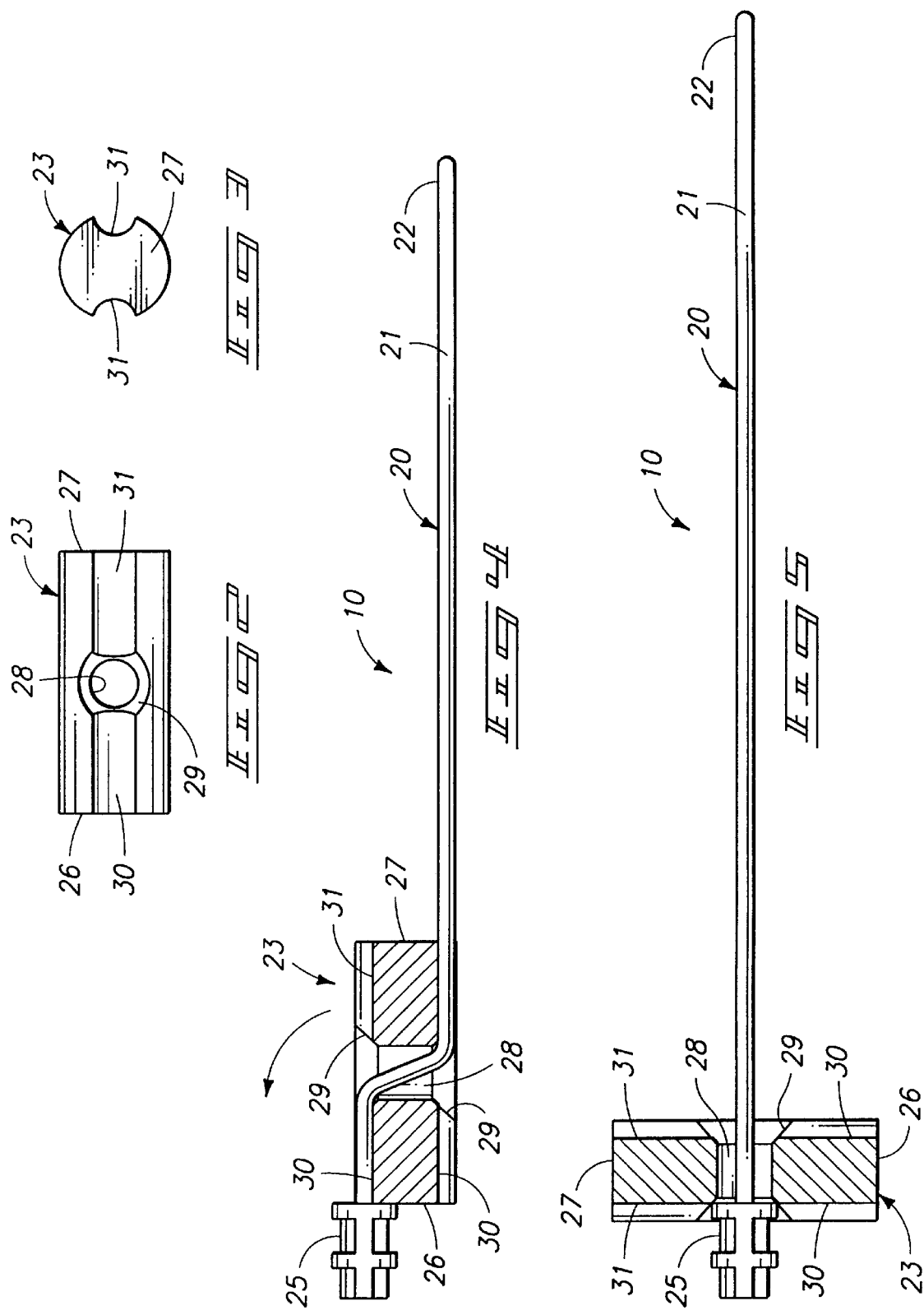

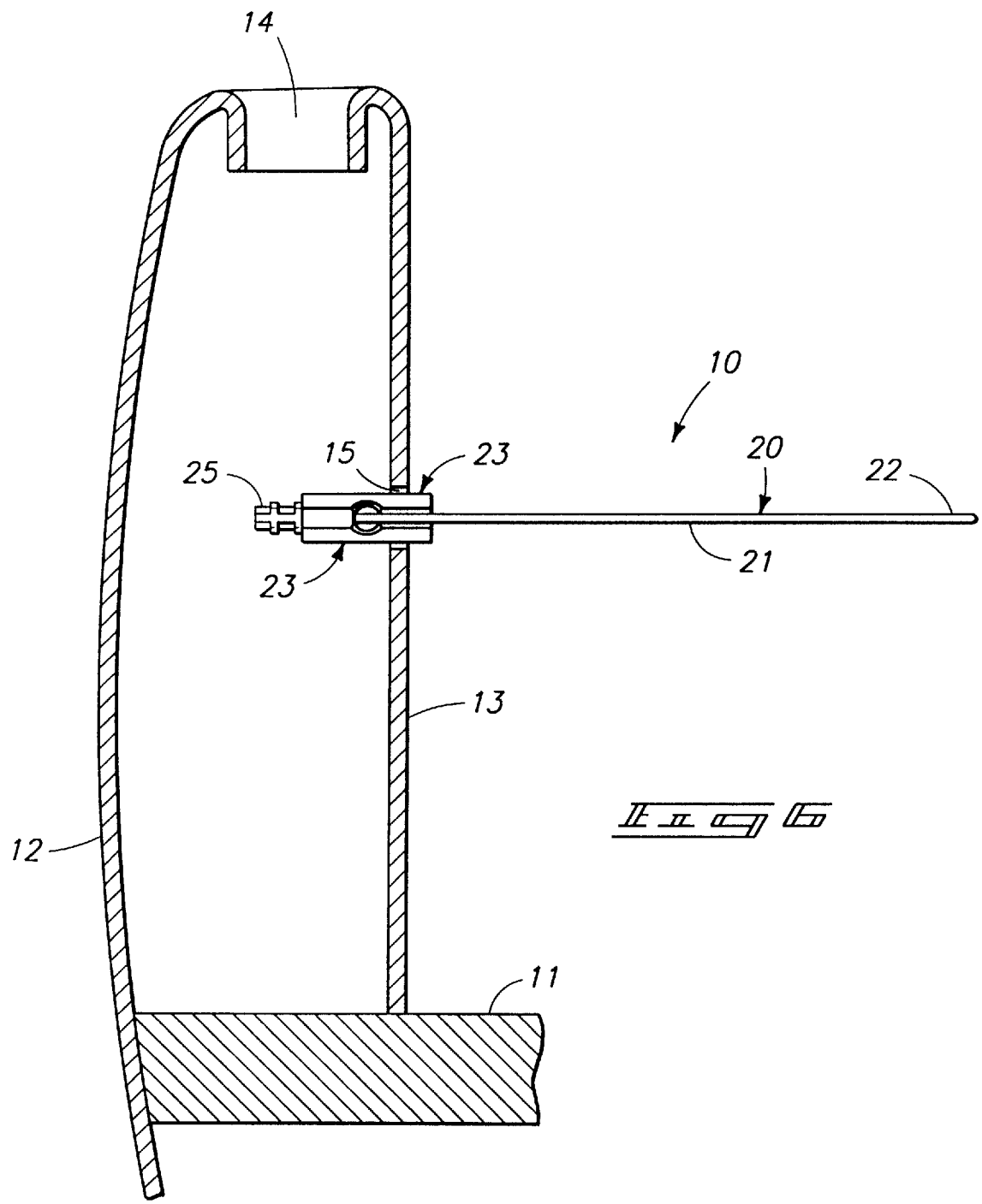

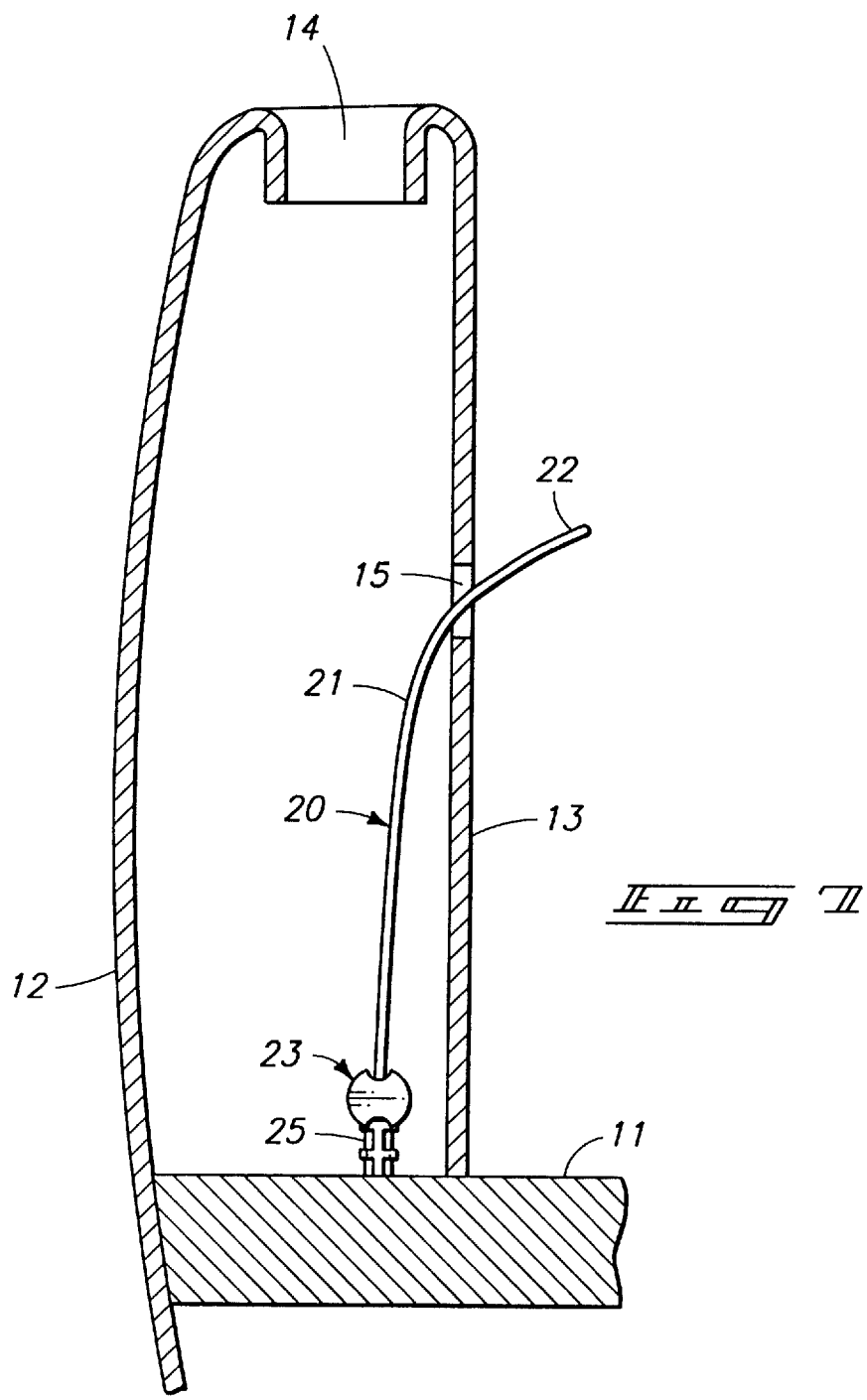

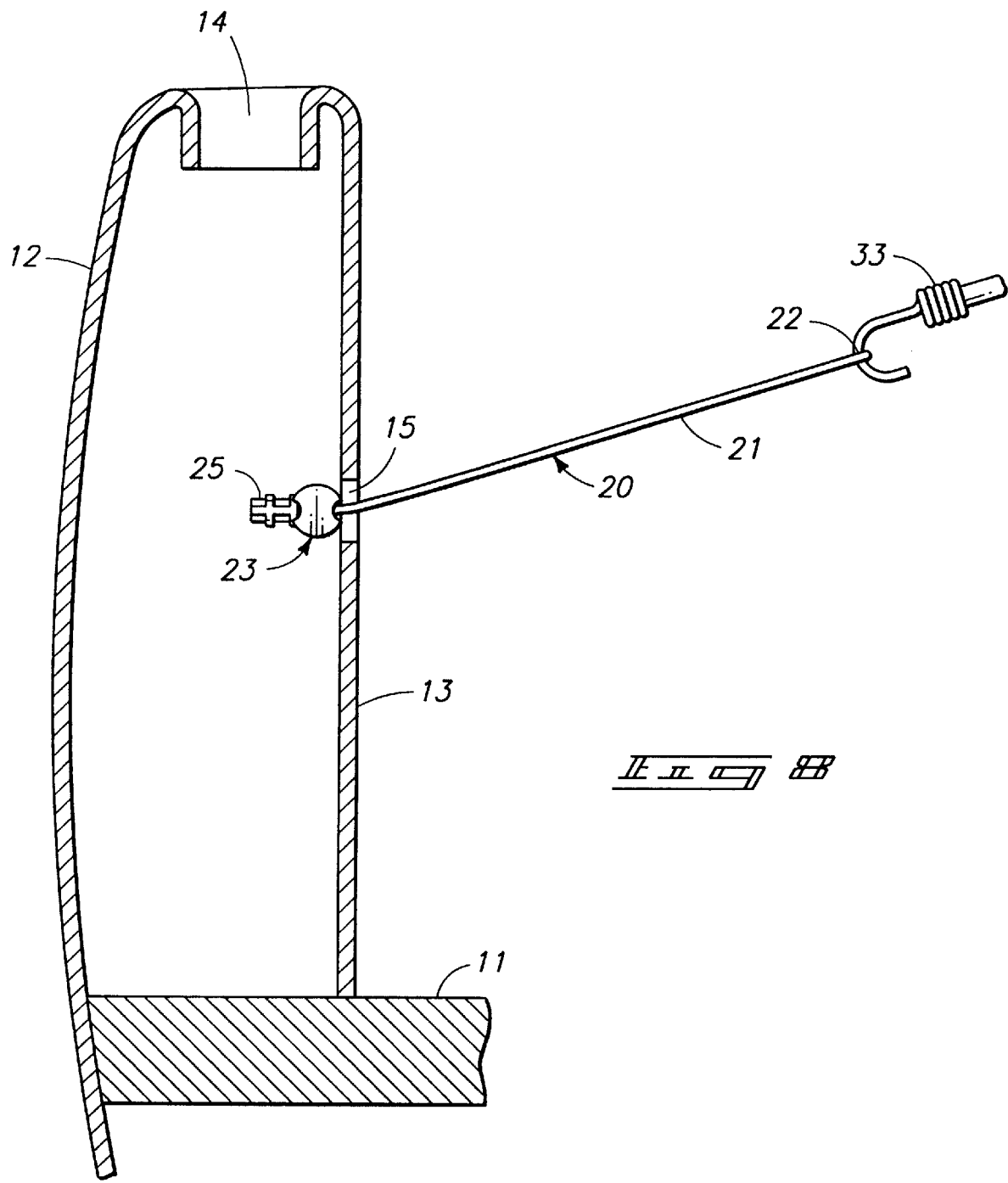

PICK-UP TRUCK TIE DOWN ANCHOR

TECHNICAL FIELD

The present invention relates to pick-up truck tie downs and particularly to anchors for attachment of tie down straps or cords.

BACKGROUND OF THE INVENTION

Many if not all full size pick-up truck beds are provided with stake pockets that can be used to support accessories such as pipe racks, stock racks, campers, canopies, or other accessories. The typical stake pocket includes a rectangular opening at the top horizontal surface of the bed side walls, and an enclosed stake pocket sleeve extending downwardly from the opening. It is also typical that the stake pocket sleeve will include a punched or otherwise formed circular opening situated below the top, rectangular opening.

While the stake pockets are useful to receive and mount the various accessories mentioned above, problems arise when a load is to be tied down to the truck bed using a strand of strap, rope or twine. There is no easily accessible part of the typical truck bed to which the strand can be tied. The stake pockets and the downwardly spaced openings are not easily used since it is difficult to thread the strand through one, then the other opening.

To solve the above problem, many pick-up truck owners go to the trouble of purchasing and mounting special eyelets or cleats to their trucks specifically for providing anchor points for tie down strands. This is an expensive and time consuming solution that often detracts from the appearance of the truck. Further, the eyelets or cleats are exposed and present a potential danger of catching on clothing or interfering with mounting of other accessories such as campers.

A need has therefor been realized for a tie down anchor that will not detract from the appearance of a truck and that will not interfere with usage of other accessories. The present invention fills this need, as will be understood from the following description and appended drawings.

BRIEF DESCRIPTION OF THE DRAWINGS

Preferred embodiments of the invention are described below with reference to the following accompanying drawings.

FIG. 2 is a plan view of a preferred elongated bolt member of the present tie down anchor;

FIG. 3 is an end view of the preferred bolt member;

FIG. 4 is a sectional view through the bolt member, and showing the presently preferred cord folded and ready for insertion into a stake pocket;

FIG. 5 is a sectional view through the bolt member, and showing the cord in a normal position in relation to the bolt member;

FIG. 6 is a view showing insertion of the preferred anchor through an opening in a pick-up truck stake pocket;

FIG. 7 is a view showing the preferred anchor installed in a pick-up stake pocket; and FIG. 8. is a view showing the preferred anchor in use.

DETAILED DESCRIPTION OF THE PREFERRED EMBODIMENTS

Figure 1:
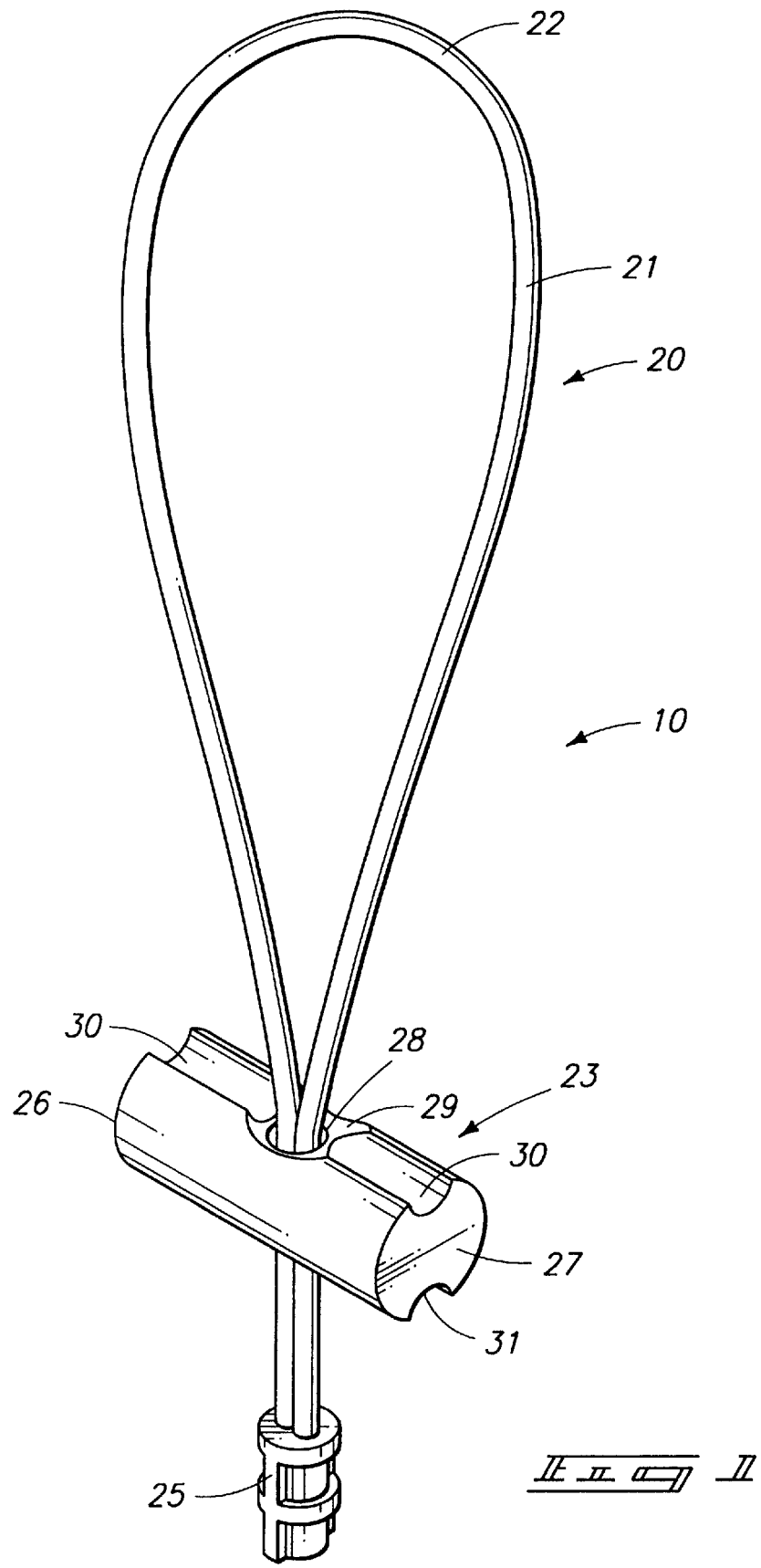
FIG. 1 is a perspective view of a first preferred form of the present tie down anchor for pick-up trucks.

This disclosure of the invention is submitted in furtherance of the constitutional purposes of the U.S. Patent Laws "to promote the progress of science and useful arts" (Article 1, Section 8).

A tie down anchor exemplifying a presently preferred form of my invention is generally shown by the reference numeral 10 in the appended drawings. The tie down anchor is intended for use on conventional pick-up trucks which include a truck bed 11 (shown in section in FIGS. 6–8) having an upstanding side wall 12 with a stake pocket 13 formed therein or attached thereto.

There are usually six stake pockets spaced about the bed 11 in spaced relation along the side walls 12, and the one illustrated is exemplary of any one of the six. The typical stake pocket 13 will include a rectangular opening 14 at a top end. It is also typical that an opening or hole 15 is formed in the sleeve of the stake pocket 13 or side wall, spaced downwardly of the top opening 14. It has been found that the openings 15 are typically approximately 0.75 inches in diameter in most American full size pick-up trucks. The present tie down anchor 10 is provided to be mounted to such a stake pocket 13, preferably through the opening 15.

In general terms, the present tie down anchor 10 includes an elongated flexible cord 20 formed into an elongated loop 21 including a bight 22 at one end. An elongated bolt member 23 is mounted to the cord adjacent the remaining end of the loop in transverse relation to the loop (FIG. 1), and is yieldably biased by the cord to such transverse relation. Through this provision, and due to dimensions of the bolt member 23, the cord can be folded against the bolt member 23 to enable insertion through the opening 15 (FIG. 6). Once the bolt member 23 is inserted into the stake pocket 13 (FIG. 7) the cord 20 will urge the bolt member 23 to return back to the transverse orientation. The bolt member 23 will thereafter movably lock the cord against removal from the opening 15 and the bight 22 can be used for tie down purposes (FIG. 8).

More specifically, the presently preferred tie down anchor 10 includes a cord 20 that is formed of flexible steel cable that is at least partially encased in a plastic sheath. It has been found that a cord of approximately 16 inches and of a diameter of approximately 0.094 inches is most desirable.

It is further preferred that the cord be formed of a laterally resilient but longitudinally rigid steel cable to provide the needed bending resiliency to urge the elongated bolt member 23 to its normal orientation, transverse to the cord loop. The cord will thus bend to allow insertion of the bolt member 23 through the opening and then spring back to return the bolt member to its original position.

It is preferred that the ends of the cord be joined by a fastener 25. Advantageously, the fastener 25 is comprised of a conventional ferrule that may be secured by swaging to the cord ends. The ferrule thus performs two functions: (1) to secure the cord ends together, thereby forming the loop; and (2) to provide an abutment surface that will prevent the cable from being pulled through the elongated bolt member 23.

The length of the cord (approximately 16 inches) has been found desirable to enable formation of a loop of approximately 8 inches. A loop of this length will allow the tie down anchor to slip to the bottom of a stake pocket 13 while the bight end 22 remains exposed outwardly of the stake pocket opening 15 for easy access as shown in FIG. 7.

The elongated bolt member 23 is preferably formed along a central longitudinal reference axis X. In one preferred form, the bolt member 23 is produced from a rigid material such as aluminum.

Bolt member 23 includes a cross-sectional width dimension that is less than its length dimension between opposed ends 26, 27. The maximum width dimension must be sufficient to allow the bolt to be inserted through the opening 15 (FIG. 6), and the length dimension must be greater than the diameter of the opening 15 so the bolt member will span the opening and lock the member in place (FIG. 8). It has been found that the most preferred maximum width dimension is 0.625 inches for an opening of approximately 0.75 inches. The preferred length dimension is 1.5 inches.

In the illustrated example, the bolt member 23 is substantially cylindrical in cross section. Thus the 0.625 dimension represents the diameter of the cylinder. The axis X is shown as the central axis of the cylindrical shape.

The preferred bolt member 23 also includes a bore 28 formed through the thickness dimension on an axis that is substantially transverse to the length dimension and substantially centered between the bolt ends. The bore is of sufficient diameter to slidably receive the doubled cord adjacent the cord ends. A bore diameter of approximately 0.312 has been found to be desirable. This diameter is less than the outside dimension of the fastener to prevent the fastener from being pulled through the bolt member. The bore 28 will thus slidably receive the loop 21 with the fastener 25 on one side of the bolt member 23 and the loop 21 extending to a remaining side of the bolt member.

The bolt member is provided with chamfers 29 on opposite sides, leading angularly into the bore 28. The chamfers and the relatively large diameter of the bore are provided to reduce the bend angle of the cord when it is folded over the bolt member (FIG. 4), thereby reducing or eliminating the possibility that the cord will permanently kink or bend when so folded. The chamfers also avoid chafing of otherwise sharp edges on the cable and thereby maximize the usable cable life.

It is advantageous that the bolt member include a first longitudinal recess 30 on one side of the bolt, extending from one end of the bolt to the bore 28, and a second recess 31 on an opposite side of the bolt extending from an opposite end of the bolt to the bore. Most preferably, two pairs of the recesses 30, 31 are provided on diametrically opposed sides of the bolt 23. The cable can thus be folded in either of two directions and be received in two of the recesses 30, 31.

The recesses 30, 31 are formed radially (with respect to the axis X) into the bolt member 23 to a depth of approximately 0.25 inches and are shaped to receive the doubled cord when it is folded against the bolt, substantially as shown in FIG. 4. This is done to minimize the effective cross-sectional dimension of the bolt member 23 and cord 20 upon insertion through the opening 15.

It is preferred that the chamfers 29 extend deeper into the bolt member than the recesses 30, 31. The edges of the recesses are thus eased (chamfered) at the bore 28 to minimize chafing of the cord and maximize the bending radius of the cord when it is folded against the bolt member.

Operation of the preferred form of the present invention is best shown with reference to FIGS. 6–8.

To install the present tie down anchor 10, the user folds the cord loop 21 to the orientation shown in FIGS. 4 and 6. The doubled cord will be received within the appropriate recesses 30, 31 to minimize the effective cross-sectional dimension of the assembly. The bolt member 23, fastener 25 and folded parts of the cord are now pushed through the side opening 15 of a selected stake pocket 13.

When the bolt member 23 slides fully into the stake pocket, the natural spring resiliency of the cord will cause the bolt member to swing back to its normal position, transverse to the cord loop 21. Now the bolt member is cross-wise to the side opening and cannot be pulled back through the opening. The anchor is now in place and is ready for use.

When the anchor is not in use, the bolt member 23 and a substantial length of the loop is allowed to slide downwardly into the stake pocket to rest against the pocket bottom. Only a short length of the loop will remain exposed (FIG. 7). The bulk of the loop is thus stored out of the way and just the bight end 22 remains exposed. The short exposed part of the cord is unobtrusive within the pick-up bed and will flex if engaged without snagging clothing or marring any load carried in the bed.

When it becomes desirable to use the anchor, the exposed bight end 22 of the loop may be grasped and pulled outward. The remaining length of the cord will then slide outwardly through the side opening 15 until the bolt member 23 comes into contact with the inside surface of the stake pocket. The bolt member 23, being cross-wise to the opening 15 and of greater length than the opening diameter, will not permit the cord to be withdrawn any further. The fastener will slide into abutment against the bolt member and hold it against the stake pocket as long as sufficient tension is applied along the cord. The user may attach one or more tie down members 33 (FIG. 8) as desired to the cord to secure a load on the truck bed.

When the tie down is detached, the cord and bolt member will slide by gravitation back through the side opening 15 to the position shown in FIG. 7. It is noted that the cord and bolt member is stowed within the stake pocket in a position clear of the stake pocket opening 14, thereby permitting normal use of the stake pocket as desired.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A tie down anchor for a pick-up truck stake pocket, comprising:

an elongated pliable cord formed into a loop;

a fastener on the cord;

an elongated bolt member having a cross-sectional width dimension and a length dimension between opposed ends, the width dimension being less than the length dimension and configured to be inserted lengthwise into a pick-up stake pocket then turned within the stake pocket to prevent withdrawal of the bolt member from the stake pocket;

the bolt member including a bore formed through the bolt member substantially transverse to the length dimension and substantially centered between the bolt member ends;

wherein the bore slidably receives the loop with the fastener on one side of the bolt member and the loop extending to a remaining side of the bolt member;

wherein the fastener is larger than the bore to prevent the loop from being pulled through the bore from the remaining side of the bolt member;

wherein the cord is formed of a resilient material such that the bolt member can be forcibly turned to a folded insertion orientation such that the bolt member length extends along the cord, and such that the resilient cord will normally spring the bolt member to a locking position transverse to the cord; and wherein the bolt member includes a chamfer at the remaining side of the bolt member, tapering from an enlarged open end to a reduced end opening into the bore, said chamfer receiving and abutting against the fastener when the fastener is pulled by the loop against the bolt member to substantially center the fastener in relation to the bore and to produce a clamping force about the fastener as tension is applied to the cord.

2. A tie down anchor for a pick-up truck stake pocket as claimed by claim 1, wherein the bolt member includes a first longitudinal recess on one side of the bolt member, extending from one end of the bolt member to the bore, and a second recess on an opposite side of the bolt member extending from an opposite end of the bolt member to the bore;

the first and second recesses being shaped to receive a length of the cord, folded against the bolt member.

3. A tie down anchor for a pick-up truck stake pocket as claimed by claim 1, wherein the bolt member includes diametrically opposed first and second pairs of longitudinal recesses formed therein, extending from both ends of the bolt member to the bore, the recesses being shaped to receive a length of the cord folded against the bolt member.

4. A tie down anchor for a pick-up truck stake pocket as claimed by claim 1, wherein the bolt member is chamfered at outward ends of the bore.

5. A tie down anchor for a pick-up truck stake pocket as claimed by claim 1, wherein:

the bolt member is formed along a longitudinal central axis; of the bolt member, extending from one end of the bolt member to the bore, and a second recess on an opposite side of the bolt member extending from an opposite end of the bolt member to the bore;

the first and second recesses each extending radially into the bolt member with respect to the central axis to a depth sufficient to receive a length of the cord, folded against the bolt member; and the chamfer extends to a radial depth in the bolt member with respect to the central axis greater than the depths of the recesses.

6. A tie down anchor for a pick-up truck stake pocket as claimed by claim 1, wherein the cord extends between cord ends, said cord ends being bound together by the fastener.

7. A tie down anchor for a pick-up truck stake pocket as claimed by claim 1, wherein the cord is comprised of a flexible steel cable at least partially encased in a plastic sheath.

8. A tie down anchor for a pick-up truck stake pocket as claimed by claim 1, wherein the cord extends between cord ends and includes a length dimension of approximately 16 inches, said cord ends being bound together by the fastener.

9. A tie down anchor for a pick-up truck stake pocket as claimed by claim 1, wherein the cord extends between cord ends, said cord ends being bound together by the fastener, and wherein the fastener is comprised of a swaged ferrule.

10. A tie down anchor for a pick-up truck stake pocket as claimed by claim 1, wherein:

the bolt member includes a maximum thickness dimension of approximately 0.625 inches; and the bolt member further includes diametrically opposed first and second pairs of longitudinal recesses formed therein, at a radial depth of approximately 0.25 inches and extending longitudinally from both ends of the bolt member to the bore, the recesses being shaped to receive a length of the cord folded against the bolt member.

11. A tie down anchor for a pick-up truck stake pocket as claimed by claim 1, wherein:

the bolt member further includes diametrically opposed first and second pairs of longitudinal recesses formed therein; shaped to receive a length of the cord folded against the bolt member; and wherein the chamfer extends to a depth in the bolt member greater than the depths of the recesses.

12. A tie down anchor for a pick-up truck stake pocket as claimed by claim 1, wherein:

the bolt member includes a maximum thickness dimension of approximately 0.625 inches;

the bolt member further includes diametrically opposed first and second pairs of longitudinal recesses formed therein, at a radial depth of approximately 0.25 inches and extending longitudinally from both ends of the bolt member to the bore, the recesses being shaped to receive a length of the cord folded against the bolt member; and the cord includes a cross-sectional diameter of approximately 0.094 inches.

13. A tie down anchor for a pick-up truck stake pocket as claimed by claim 1, wherein:

the bolt member is substantially cylindrical and includes a diameter of approximately 0.625 inches;

the bolt member is approximately 1.5 inches in length; and the bolt member further includes diametrically opposed first and second pairs of longitudinal recesses formed therein, at a radial depth of approximately 0.25 inches and extending longitudinally from both ends of the bolt member to the bore, the recesses being shaped to receive a length of the cord folded against the bolt member.

14. A tie down anchor for a pick-up truck stake pocket having a side opening, comprising:

a cord formed into a loop configuration;

a fastener at an end of the loop rigidly connected to the cord;

an elongated bolt member having a cross-sectional width dimension and length dimension between opposed bolt member ends greater than the width dimension;

the bolt member including a bore that is substantially transverse to the length dimension and substantially centered between the bolt member ends;

wherein the bore slidably receives the loop with the fastener on one side of the bolt member and the loop extending to a remaining side of the bolt member;

wherein the fastener is smaller in cross section than the length dimension and larger than the bore so the fastener may be received through a stake pocket side opening and will abut against the bolt member when the loop is pulled through the bolt member from the remaining side of the bolt member;

wherein the cord is formed of a laterally resilient material such that the bolt member can be forcibly turned to an orientation such that the bolt member length extends along the cord for insertion through the side opening in a pick-up stake pocket, and such that the resilient cord will urge the bolt member to a position transverse to the cord and cross-wise to the opening within the stake pocket, thereby locking the cord against being pulled from the opening.

15. A tie down anchor for a pick-up truck stake pocket having a side opening, as defined by claim 14, wherein the elongated bolt member includes at least one cord receiving recess leading from one of the ends to the bore.

16. A tie down anchor for a pick-up truck stake pocket having a side opening, as defined by claim 14 wherein the cord is longitudinally rigid.

17. A tie down anchor for a pick-up truck stake pocket, comprising:

an elongated flexible cord formed into an elongated loop including a bight at one end and a remaining end;

an elongated bolt member mounted to the cord adjacent the remaining end in a normal transverse relation to the loop with respect to a length dimension of the bolt, a substantially transverse bore formed through the elongated bolt member, slidably receiving the loop;

a fastener secured to the remaining end of the loop on one side of the bolt member. the fastener being larger than the bore such that the loop will slide through the bore but the fastener will prevent the loop from being pulled through the bore in one direction;

wherein the cord is laterally resilient to provide bending resiliency to urge the elongated bolt member to a normal orientation, with the length dimension transverse to the cord loop such that the cord will bend to allow insertion of the bolt member into a pick-up truck stake pocket and then spring back to return the bolt member to its normal transverse relation to the loop, preventing the bolt from being withdrawn from the pick-up truck stake pocket.

18. A tie down anchor for a pick-up truck stake pocket, as claimed by claim 17, wherein the elongated bolt member includes a longitudinal recess formed therein leading from one end of the bolt member to the cord.

19. A tie down anchor for a pick-up truck stake pocket, as claimed by claim 17, wherein the cord is comprised of a flexible steel cable.

20. A tie down anchor for a pick-up truck stake pocket, as claimed by claim 17, wherein the cord is comprised of a flexible steel cable, and includes a length dimension of approximately 16 inches.

* * * * *